Dec. 4, 1923.

R. L. COOK

MIXER AND FEEDER

Filed Dec. 30, 1922

1,476,493

INVENTOR:
Ralph L. Cook,
BY E. T. Silvius,
ATTORNEY.

Patented Dec. 4, 1923.

1,476,493

UNITED STATES PATENT OFFICE.

RALPH L. COOK, OF MOORESVILLE, INDIANA.

MIXER AND FEEDER.

Application filed December 30, 1922. Serial No. 609,839.

*To all whom it may concern:*

Be it known that I, RALPH L. COOK, a citizen of the United States, residing at Mooresville, in the county of Morgan and State of Indiana, have invented a new and useful Mixer and Feeder, of which the following is a specification, reference being had to the accompanying drawings, and to the letters and figures of reference marked thereon.

This invention relates to a machine for mixing different kinds of grain or ground food together and apparatus constituting portions thereof adapted to be used as feeders from which animals and fowls may obtain the mixed food, the invention having reference more particularly to a rotary mixer having feed troughs connected thereto from which mixed feed may be taken and consumed, removal of food from a trough causing automatic feeding to refill the trough.

An object of the invention is to provide an efficient mixer and feeder of the above-mentioned character which may be constructed at small cost and be suitable for hand-power operation, and which shall be so constructed as to obviate the necessity of transferring mixed food from a mixer to a separate trough or vessel for use.

Another object is to provide a mixer and automatic feeder in which food or other substances may be mixed in dry condition and kept for a time in a dry state and cleanly condition, and so fed directly to animals and fowls.

A still further object is to provide a mixer and automatic feeder which shall be of such construction as to insure economical supply of mixed food without being wasteful, and which shall be highly efficient and durable in use.

With the above-mentioned and other objects in view, the invention consists in a mixing and feeding apparatus having novel features of construction, more particularly with respect to feed troughs combined in a novel manner therewith, the invention consisting also further in the novel parts, and in the combinations and arrangements of parts, as hereinafter particularly described and further defined in the claims appended hereto.

Figure 1:
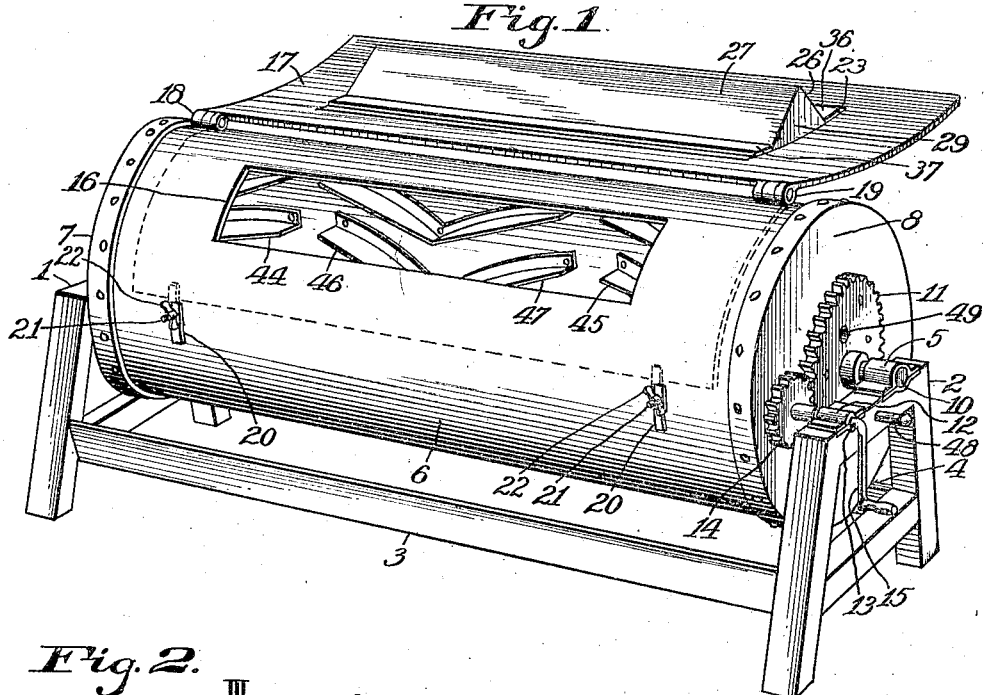
Figure 2:
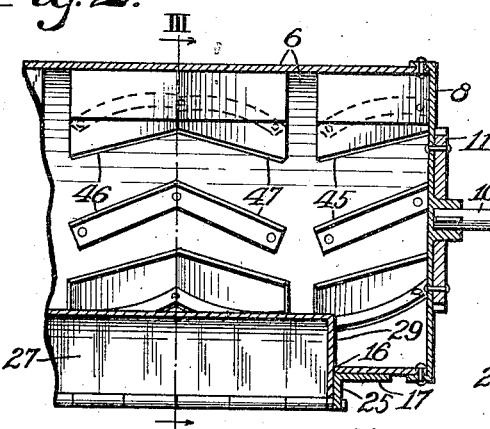
Figure 3:
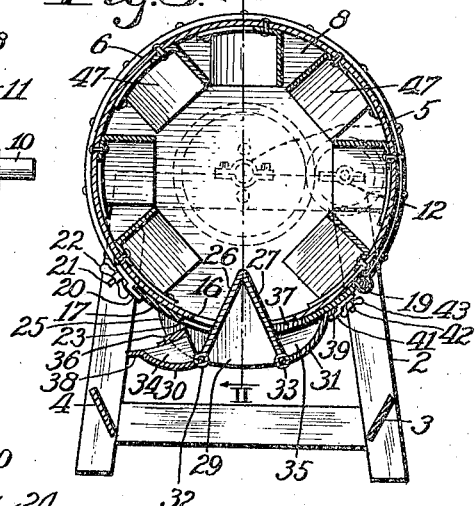
Figure 4:
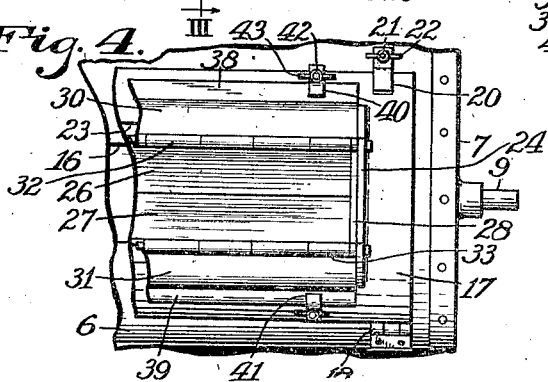

Referring to the drawings,—Figure 1 is a perspective view of a machine or apparatus constructed substantially in accordance with the invention, being seen as in position to receive articles to be mixed; Fig. 2 is a fragmentary longitudinal section, as on the line II—II in the figure following; Fig. 3 is a transverse section approximately on the line III—III in Fig. 2; and, Fig. 4 is a fragmentary external view showing a plan of the feeding apparatus.

Similar reference numerals in the various figures of the drawing indicate corresponding elements or features of the invention herein referred to in detail.

A practical embodiment of the invention comprises suitable upright frame members 1 and 2 to which rails 3 and 4 are connected, each upright member being provided with a journal box 5. A mixing vessel is provided which comprises a cylindrical shell 6 and heads 7 and 8 secured to the ends of the shell, the vessel being arranged between the upright frame members; and the heads are provided with journals 9 and 10 respectively that are rotatably supported by the journal boxes. One journal has a gear wheel 11 thereon which preferably is secured to the adjacent head 8. The frame member 2 is provided also with a journal box 12 in which a shaft 13 is rotatably arranged, the shaft having a pinion 14 secured thereto to engage the wheel 11. The shaft 13 has a crank arm 15 fixed thereon whereby to operate the mixer.

The shell 6 has a longitudinal slot 16 of suitable width therein. A door 17 to close the slot is provided and it is connected at one edge thereof to the shell 6 by means of hinges 18 and 19, the opposite edge of the door being detachably secured to the shell by means of clamps 20 arranged on the screw-studs 21 provided with wing nuts 22, the clamps being arranged to turn on the studs. The door 17 has an aperture 23 therein to correspond approximately to the slot 16, preferably being slightly broader than the slot. The door has flanges 24 and 25 on the outer side thereof and at the opposite ends of the aperture 23. A divider is provided which comprises two plates 26 and 27 connected together at one edge and extending divergently each to the other and have end plates 28 and 29 fixed thereto, the end plates being fixed to the flanges 24 and 25 respectively so that the divider shall extend through the aperture 23 clear of the sides of the opening which leaves outlet slots in the aperture 23 adjacent to the divider plates 26 and 27. Similarly the divider is free of contact with the sides of the slot 16 so as to provide outlet slots corresponding to the outlet slots or openings in the door. Two troughs 30 and 31 are provided which are connected to the outer edges of the plates 26 and 27 and 28 and 29 by means of hinges 32 and 33 respectively, the troughs having end members 34 and 35 respectively that are arranged adjacent to the flanges 24 and 25 and have slats 36 and 37 secured thereto that close the outlet slots or openings in the door when mixing operations are carried on. The forward edges of the troughs have lips 38 and 39 thereon respectively which are detachably secured to the outer side of the door by means of clamps 40 and 41 arranged on studs 42 secured to the door and wing nuts 43 on the studs.

The inner side of the shell is provided with a suitable number of mixer blades, there being preferably a number of blades 44 that extend from the head 7 at an oblique angle thereto or spirally along the shell, other blades 45 extending from the head 8 in the opposite direction, so as to tend to work the articles away from the heads of the vessel, and the substance being mixed is worked from the middle portion towards the heads by reversely arranged blades 46 and 47. Preferably the arrangement of the blades is such that when the apparatus is set for feeding, as in Fig. 3, none of the blades shall form pockets and prevent the feed from flowing downward, the blades at one side of the shell being reversely arranged rotatively to those on the opposite side, all the blades being properly inclined so that the substances shall slide downward and eventually pass into the feed troughs.

The apparatus is provided with suitable latching means, such as a bolt 48 slidingly supported by the frame member 2 to be pushed into sockets 49 which may be made in the gear wheel 11, one socket being arranged to be used when the vessel is turned so as to bring the slot 16 at the upper portion of the shell to receive articles requiring mixing.

In practical use the door 17 is swung back as in Fig. 1 to uncover the slot 16, after which the articles or substances are placed in the vessel through the slot 16. The door should then be swung over to close the slot and properly secured to the shell by means of the clamp 20. On rotation of the driving shaft 13 the pinion 14 rotates the gear wheel 11 and the vessel, the rotation of the vessel and the changing positions of the mixer blades causing different substances to be tumbled about and finally mixed together in the vessel. Having turned the vessel a number of times in one direction it may be alternately turned in the opposite direction with an advantage in the matter of expediting the mixing operations. Having mixed a batch of food, the vessel should be turned over so as to bring the door 17 under the shell, the troughs may be released from the clamps and permitted to swing downward so as to carry the shutter slats 36 and 37 away from the feed opening, and permit the food to flow down the side of the plates 26 and 27 and into the troughs from which animals or fowls may feed. The troughs when set for use may be supported and prevented from swinging down farther than necessary, by any suitable link or other device preferred by the constructor, as for example, wooden strips may be placed under the troughs so as to rest on portions of the main frame, or blocks may be placed on the ground beneath the trough. When the supply of food has become exhausted it may be desirable to permit the troughs to swing down sufficiently to permit them to be thoroughly cleansed and washed.

After securing the troughs again in closed position the mixing operations may be repeated as before, the portions of the divider plates 26 and 27 that are within the vessel serving as mixer blades when the vessel is rotated.

What I claim is:

1. A mixer and feeder including a rotary vessel having a shell provided with a slot and a door connected to the shell and having a feed-trough hinged thereto and adapted to cover or uncover the slot.

2. A mixer and feeder including a rotary vessel having mixer blades on the inner side and a feed-trough on the outer side thereof, the wall of the vessel having an outlet-opening therein to be closed by the feed-trough.

3. A mixer and feeder including a rotary vessel having mixer blades on the inner side and two feed-troughs hinged on the outer side thereof, the wall of the vessel having an opening therein to be partly closed by the feed-troughs, and a divider supported outside the vessel and extending through and partly closing the opening in the wall.

4. A mixer and feeder including a rotary vessel having a shell provided with a slot, a door detachably connected to the shell and having an aperture therein, a divider secured to the door and extending through but not closing the aperture and the slot, two feed-troughs hinged to the divider outside the shell and extending in opposite directions from the divider, and means to detachably secure the troughs to the shell.

5. A mixer and feeder including a rotary vessel having a slot in the wall thereof, a divider supported on the outside of the vessel and comprising two side plates extending convergently each to the other through the slot, and two feed-troughs hingedly connected to the outer portions of the side plates respectively, each trough having a slat on its top to close the slot adjacent to one of the side plates, and means to secure the troughs to the outside of the vessel.

6. A mixer and feeder comprising a frame, a cylindrical vessel having journals rotatably supported on the frame, the wall of the vessel having a longitudinal slot therein, a gear wheel fixed to one of the said journals, a driving shaft rotatably supported on the frame, a pinion fixed to the driving shaft and engaging the gear wheel, mixer blades secured to the inner side of the wall of the vessel, a door hinged to the wall of the vessel and having an aperture therein corresponding to said slot, clamps mounted on the outside of the vessel to detachably secure the door to the vessel, a divider carried by the door and extending through said aperture and carried partially into said slot, the divider being narrower than the aperture and the slot, two feed-troughs hingedly supported on the outside of the door at opposite sides respectively of the divider and having each a slat on the top thereof to close said aperture adjacent to the divider, and clamps mounted on the door to detachably secure the feed-troughs to the door.

In testimony whereof, I affix my signature on the 23rd day of December, 1922.

RALPH L. COOK.